July 31, 1945.    O. F. GILLIAM    2,380,428
APPARATUS FOR SMOKING AND CURING FOODSTUFFS
Filed April 25, 1942    3 Sheets-Sheet 1
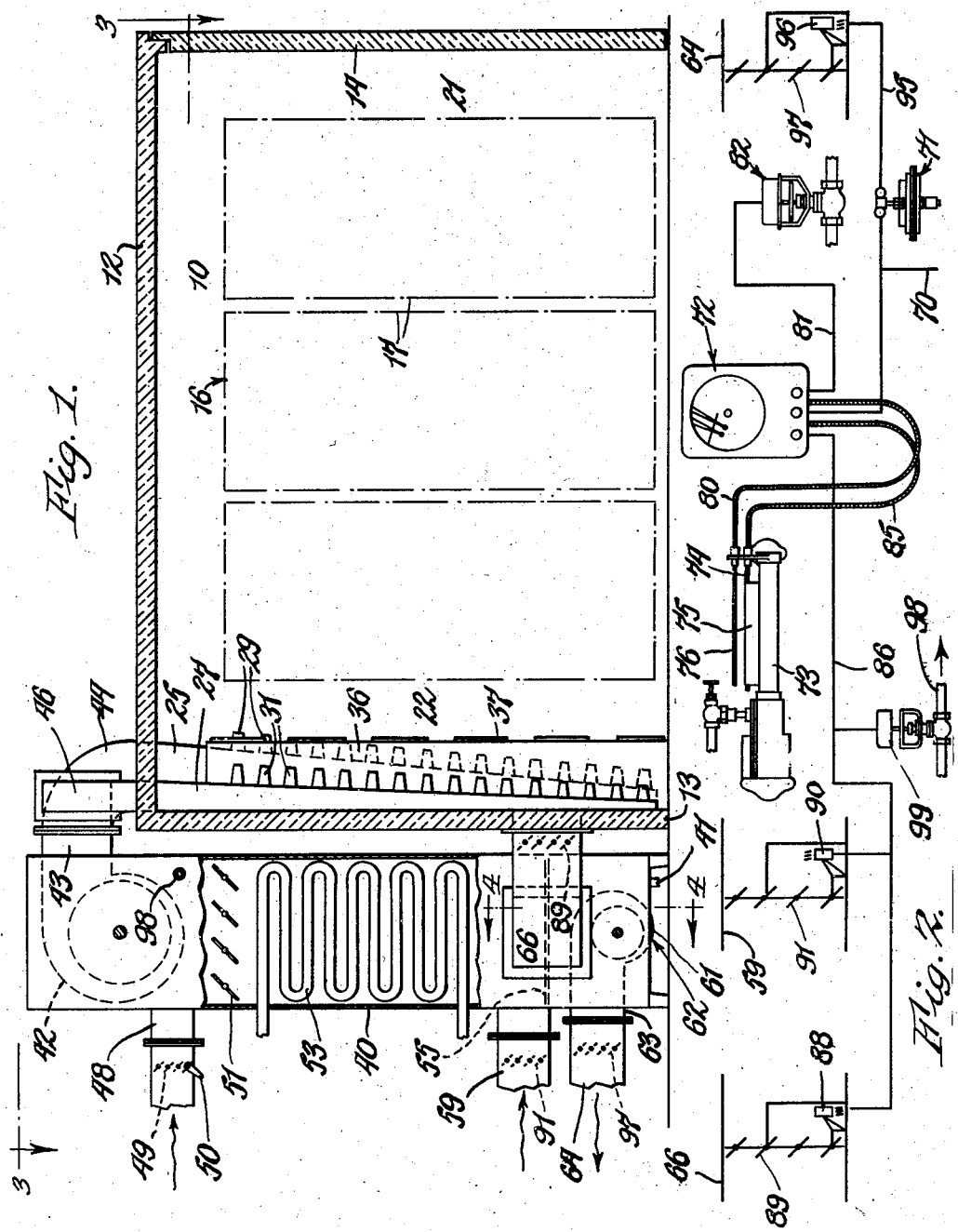
INVENTOR
Oliver F. Gilliam
BY
Popp and Popp
ATTORNEYS

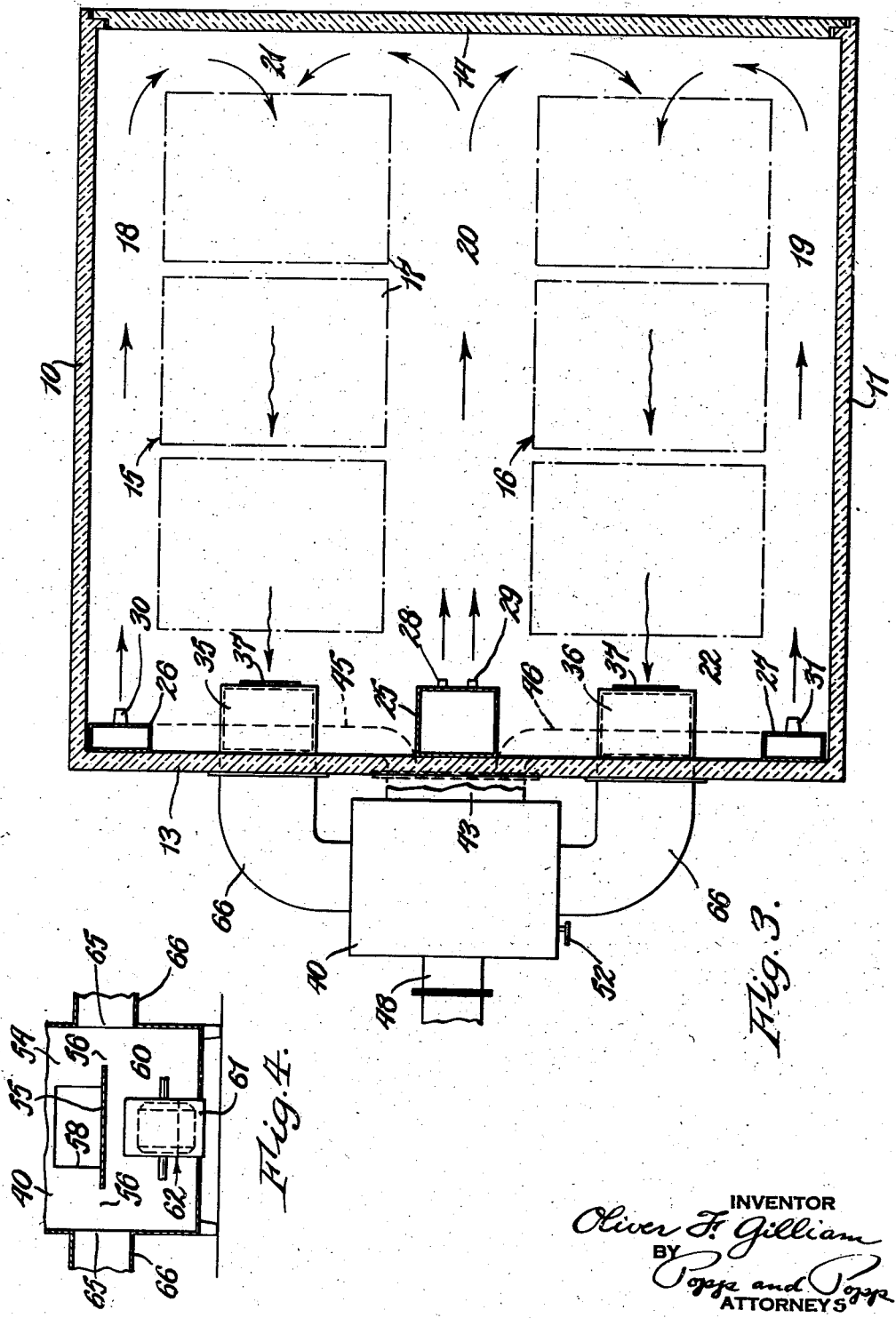

July 31, 1945.   O. F. GILLIAM   2,380,428
APPARATUS FOR SMOKING AND CURING FOODSTUFFS
Filed April 25, 1942   3 Sheets-Sheet 3
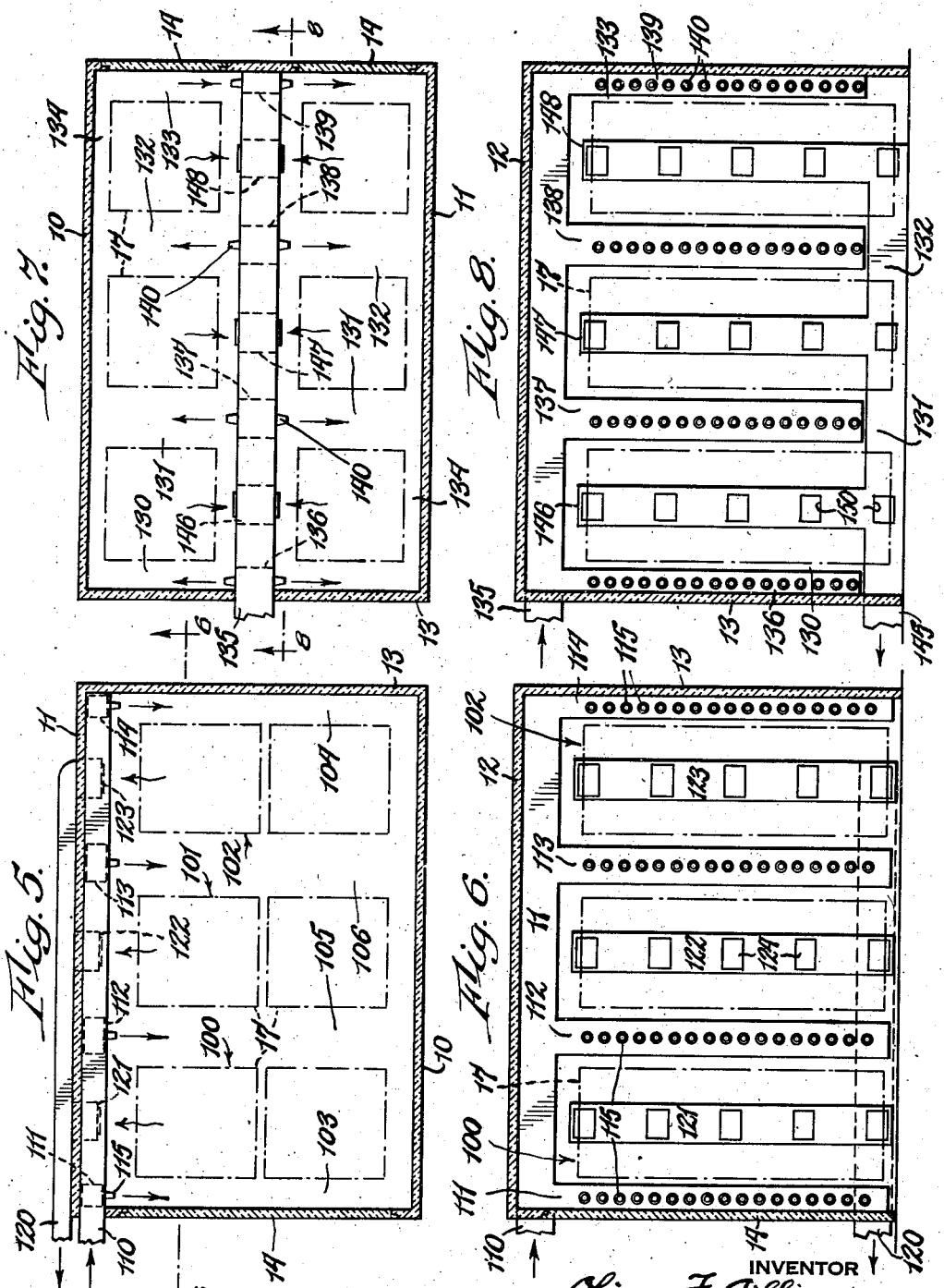
INVENTOR
Oliver F. Gilliam
BY
Popp and Popp
ATTORNEYS Patented July 31, 1945

2,380,428

UNITED STATES PATENT OFFICE 2,380,428

APPARATUS FOR SMOKING AND CURING FOODSTUFFS

Oliver F. Gilliam, Evanston, Ill., assignor to Niagara Blower Company, New York, N. Y., a corporation of New York Application April 25, 1942, Serial No. 440,458

4 Claims. (Cl. 99—259)

This invention relates to apparatus for smoking and curing food products and more particularly to such apparatus for smoke curing and preserving of such perishables as hams, bacon, fish and other foods adapted to be smoke cured.

In the commercial smoke curing of such food products, it is desirable to provide a smokehouse which can be loaded with a large quantity of the food products hung or supported on portable trees, racks or the like and in which a positive circulation of the air in the smokehouse is maintained. The temperature, relative humidity and smoke content of the air so circulated is controlled to effect the proper drying, curing and smoking of the food products. It is further desirable that the air so regulated as to temperature, humidity and smoke content be uniformly distributed through the food products in the smokehouse to effect the uniform drying, curing and smoking of the products regardless of their location in the smokehouse and thereby to obtain a uniform product of high quality.

The principal object of the present invention is to provide apparatus for introducing air of controlled temperature, relative humidity and smoke content into a smokehouse and for removing the air therefrom which insures uniform distribution of the air to the food products loaded therein, thereby to obtain uniform drying, curing and smoking of the food products regardless of their location in the smokehouse and with a resultant product of uniform and improved quality.

Another object of the invention is to provide a smokehouse in which the amount of ductwork required to effect such distribution of the conditioned air can be reduced to a minimum, thereby to increase the amount of usable space and to increase the capacity of the smokehouse.

Another object of the invention is to provide a smokehouse in which overhead or ceiling ductwork can be eliminated thereby to permit of decreasing the height of the smokehouse.

Another object is to provide such a smokehouse in which the distributing ducts can be arranged along the wall opposite the access doors to the smokehouse, in which position there is the least interference with the loading, unloading or inspection of the products being processed.

Other objects are to provide such apparatus which is inexpensive to construct and install and is readily accessible for repair or adjustment.

In the accompanying drawings:

Fig. 1 is a vertical section through a smokehouse embodying and adapted to carry out the present invention and showing, diagrammatically, an air conditioning unit for supplying and circulating air of the desired temperature, relative humidity and smoke content therethrough.

Fig. 2 is a diagrammatic representation of the control instruments used in connection with the air conditioning unit to regulate the temperature, humidity and static pressure of the air within the smokehouse.

Fig. 3 is a horizontal section through the smokehouse, taken on line 3—3, Fig. 1.

Fig. 4 is a fragmentary vertical section, through the air conditioning unit, taken on line 4—4, Fig. 1.

Fig. 5 is a horizontal section, similar to Fig. 3, through a smokehouse having the ductwork arranged in accordance with a modified form of my invention.

Fig. 6 is a vertical section taken on line 6—6, Fig. 5.

Fig. 7 is a view similar to Figs. 3 and 5 and showing a still further modified form of my invention.

Fig. 8 is a vertical section, taken on line 8—8, Fig. 7.

With particular reference to the form of the invention shown in Figs. 1-4, the smokehouse illustrated is of the insulated panel type of construction having side walls 10, 11, a roof 12, a rear wall 13 and having a front wall providing an access door 14 which can be mounted in any suitable manner. The smokehouse is shown as adapted to be loaded with two rows 15, 16 of trucks 17, these trucks carrying the usual trees or racks (not shown) on which the foods to be smoke cured are hung or otherwise supported. The rows 15 and 16 of the trucks are arranged so as to leave a relatively narrow aisle or space 18 between the row 15 of trucks and the side wall 10 of the smokehouse; an aisle or space 19 of similar width between the row 16 of trucks and the side wall 11 of the smokehouse; and a central, relatively wide aisle or space 20 between the two rows 15 and 16 of the trucks and through which convenient access can be had to the trucks and to the products loaded thereon. The rows 15, 16 of the trucks extend fore and aft from the front access door 14 of the smokehouse to the rear wall 13 thereof, these rows being spaced, however, from the front wall or access door 14 of the smokehouse so as to leave a transverse space or aisle 21 between the front wall of the smokehouse and the front ends of the rows 15, 16 of trucks, and these rows being also spaced from the rear wall 13 of the smokehouse so as to leave a transverse space or aisle 22 between the rear wall of the smokehouse and the rear ends of the rows 15, 16 of food products. It will therefore be seen that each row 15, 16 of trucks is surrounded on all four sides with a continuous or endless space and that the space between the two rows 15 and 16 is wider than the spaces between the other sides of each row of trucks and the corresponding wall of the smokehouse.

The smoke laden air is introduced into the smokehouse through a central supply duct 25 and two side supply ducts 26 and 27. The inlet end of each of these supply ducts extends through the roof 12 of the smokehouse and each of these ducts extends vertically downward against the rear wall 13 of the smokehouse and to the floor thereof. The central supply duct 25 is of approximately double the capacity of each of the side supply ducts 26, 27 and is arranged centrally of the space or aisle 20 and is provided with two vertical rows of nozzles 28, 29 which discharge the conditioned air horizontally forward into the central part of the aisle or space 20. Each of these rows of nozzles, as best shown in Fig. 1, extends from approximately the floor level of the smokehouse to the level of the tops of the trucks 17 or other structures which carry the produce to be smoke cured. The side supply duct 26 is arranged against the side wall 10 of the smokehouse and is provided with a vertical row of nozzles 30 which project horizontally forward to discharge the conditioned air along the side wall 10 of the smokehouse and into the side aisle or space 18. Similarly the side supply duct 27 is arranged against the side wall 11 of the smokehouse and is provided with a vertcal row of nozzles 31 which project horizontally forward to discharge the conditioned air along the side wall 11 of the smokehouse and into the side aisle or space 18. Each of the row of nozzles 30, 31 in the side supply ducts extends from the floor level to the same height as the rows of nozzles 28, 29 of the central supply duct 25.

Air is withdrawn from the smokehouse through a pair of return air ducts 35, 36, each of which extends upwardly short of the roof 12 of the smokehouse and being arranged against the rear wall 13 of the smokehouse. Each of these return air ducts 35, 36 is provided with a vertical row of outlet openings in its front wall, each opening having an adjustable slide or shutter 37. The return air duct 35 is in vertical central alinement with the row 15 of the trucks 17 which carry the produce to be smoked and similarly the return air duct 36 is in vertical central alinement with the row 16 of these trucks.

Air of the desired temperature, relative humidity and smoke content can be supplied through the supply ducts 25, 26 and 27 to the smokehouse, and withdrawn therefrom through the return air ducts 35 and 36 by any suitable apparatus, the unit air conditioning apparatus shown in the copending application for patent of Charles N. Deverall, Serial No. 349,618, filed August 2, 1940, issued February 9, 1943, as Patent No. 2,310,222, being suitable for this purpose and being generally constructed as follows:

This unit air conditioner comprises an enclosed vertical casing 40 arranged centrally of the rear wall 13 of the smokehouse and which is formed at its lower end to provide a drain pan provided with a drain 41. The upper end of the casing 40 houses the scroll of a supply fan 42, the inlets of this scroll being in communication with the interior of the casing 40 and the outlet 43 of the scroll being connected by a central branch duct 44 with the upper end of the central supply duct 25 and by a pair of branch ducts 45 and 46 with the upper ends of the supply ducts 26 and 27, respectively. The branch ducts 44, 45 and 46 are all arranged above the roof 12 of the smokehouse and connect with the ends of the vertical ducts 25, 26 and 27 which project through the roof 12 of the smokehouse.

Adjacent the lower end of the supply fan 42 the casing 40 is provided with a smoke inlet pipe 48, this smoke pipe leading from the usual smoke pot (not shown) which supplies smoke for the operation of the smokehouse. The volume of smoke drawn into the unit through the smoke pipe 48 is controlled by dampers 49 in this pipe, these dampers being under the manual control of a hand lever 50. A plurality of volume control dampers 51 are provided directly below the supply fan 42, these dampers preferably being under manual control of a hand lever 52 and below these volume control dampers is arranged a heating coil 53.

A supply chamber 54 is arranged below the heating coil 53, the lower wall of this supply chamber being formed by a horizontal baffle plate 55, as best shown in Fig. 4, this horizontal baffle plate being secured at its opposite ends to the front and rear walls of the casing 40 but being spaced from the side walls thereof so as to provide openings 56. Outside or fresh air is admitted to this supply chamber through an inlet 58 which is arranged in the front wall of the casing 40 and discharges outside air on top of the baffle plate 55. To prevent bypassing of this outside air around and under the baffle plate 55, this air inlet 58 is narrower in a horizontal direction than the baffle plate 55, as illustrated in Fig. 4. This outside air inlet 54 is connected to an outside air duct 59.

An exhaust chamber 60 is provided in the bottom of the casing 40 below the baffle plate 55. In this exhaust chamber is arranged the scroll 61 of a static pressure fan, indicated generally at 62, this scroll having inlets at its opposite sides in communication with the exhaust chamber 60 and having its outlet 63 extending through the rear wall of the casing 40 and connected with an exhaust duct 64.

The return air from the smokehouse is introduced into the lower part of the casing 40 in such manner that a part of this return air is drawn into the supply chamber 54 and the balance is drawn into the exhaust chamber 60 to be discharged by the static pressure fan 62. For this purpose each side wall of the casing 40 is provided with a return air inlet 65, each of these inlets leading into the corresponding space 56 at each side of the baffle plate 55 so that the two inlets 65 are intersected by the plane of this baffle plate 55, as best shown in Fig. 4. The inlets 65 are connected by a pair of ducts 66 with the central parts of the return ducts 35 and 36 of the smokehouse through the rear wall 13 thereof.

Referring to the diagrammatic representation of the control instruments used in connection with the air conditioning unit as above described to regulate the temperature, humidity and static pressure of the air within the smokehouse, the numeral 70 represents an air pressure supply line through which air is supplied at, say, 15 pounds pressure, to a static pressure regulator 71, which can be arranged within the smokehouse, and to a double pen recording regulator 72. The numeral 73 represents an automatic water pan of a wet bulb thermostat 74, the sensitive part of which is encased with a covering of absorbent material 75, the lower part of which is immersed in the water contained in the automatic water pan 73. The automatic water pan is also arranged to support a dry bulb thermostat 76 and the automatic water pan can be arranged in one of the return air ducts 66 so that the sensitive parts of the wet and dry bulb thermostats are responsive to the wet and dry bulb temperature of the air within the smokehouse.

The control line 80 from the dry bulb thermostat 76 leads to the double pen recording regulator 72 and through this regulator controls the air pressure in a line 81 leading to a diaphragm valve 82 which controls the admission of steam to the heating coil 53 in the central part of the casing 40. The control line 85 from the wet bulb thermostat 74 leads to the double pen recording regulator 72 and through this regulator controls the air pressure in a line 86 leading to a motor 88 controlling a set of dampers 89 in one or both of the return air ducts 66 and also leads to a motor 90 controlling a set of dampers 91 in the outside air duct 59. The motors 88 and 90 work in opposition to each other, the change in pressure in the line 86, under control of the wet bulb thermostat 74, actuating one of these motors to open the corresponding set of dampers and actuating the other motor to close the corresponding set of dampers.

The outlet line 95 from the static pressure regulator 71 controls a damper motor 96 which in turn controls a set of dampers 97 in the exhaust duct 64.

For the purpose of humidifying the air introduced into the smokehouse when required for the processing of the foodstuffs therein, a steam pipe 98 extends through the side of the casing 40 and is arranged to discharge steam therein so as to humidify the air drawn into the supply fan 42. Also by arranging this steam pipe to discharge into the air before being drawn into the supply fan, if the unit or ductwork catches on fire, this steam spray can be employed to choke the fire. The steam supplied through the pipe 98 is under control of a diaphragm valve 99 which is connected with the control line 86 from the double pen recording regulator 72.

In the operation of the air conditioning unit smoke is supplied from a suitable smoke pot (not shown) through the smoke pipe 49 into the upper part of the casing 40, the admission of the smoke being under manual control of the dampers 49 regulated by the hand lever 50. This smoke is drawn into the supply fan 42 together with air drawn from the lower part of the casing 40 under control of the volume control dampers 51 which are manually regulated by the handle 52. The smoke laden air so drawn into the supply fan 42 is discharged from the fan outlet 43 into the central branch 44 leading to the central supply duct 25 in the smokehouse and into the side branches 66 leading, respectively, to the side supply ducts 26 and 27 in the smokehouse. This air is discharged forwardly into the aisles 18, 19 and 20 by the nozzles on these supply ducts. The setting of the volume control dampers 51 controls the amount of air which is supplied to the smokehouse; the velocity of the air so introduced; and also, to a certain extent, the density of the smoke in this air, this density being determined by the proportional adjustment of these volume control dampers 51 and the smoke dampers 49.

The air is withdrawn from the smokehouse through the outlet openings in the two return air ducts 35 and 36 which are rendered adjustable by the provision of the shutters 37. From the return ducts 35 and 36, this air is drawn through the ducts 66, past the control dampers 89 into the return air openings 65 in the bottom of the casing 40. These openings are arranged to discharge into the spaces 56 at the edges of the baffle plate 55 and hence a part of this return air enters the supply chamber 54 above this baffle plate and the other part enters the exhaust chamber 60 below this plate 55. The exhaust chamber 60 is exhausted by the static pressure fan 62, the inlets of which are arranged in this exhaust chamber 60 and the outlet of which discharges into the exhaust duct 64, this discharge being under control of the dampers 97.

Outside air is also drawn into the supply chamber 54. This outside air is under control of the motor operated dampers 91 in the fresh air duct 59 leading to the outside air inlet opening of this supply chamber 54. In order to prevent short circuiting of this outside air to the exhaust chamber 60, this outside air is introduced immediately above the baffle 55 at its center and parallel with its major axis so that there is no danger of this outside air flowing down through the openings 56 at the sides of the baffle plate 55 along with the return air being exhausted from the unit, as previously described.

The outside air and the return air drawn into the supply chamber 54 mixes and passes up through the heating coil 53 and is heated thereby when heat is required in the smokehouse. This heated air is then drawn past the volume control dampers 51 by the supply fan 42, this heated air being also mixed with the smoke supplied through the smoke inlet 48.

In the operation of the smokehouse the static pressure regulator 71 is set to maintain a predetermined atmospheric pressure within the smokehouse. When the static pressure within the smokehouse departs from the setting of the static pressure regulator 71, it alters the pressure in its outlet line 95 to open or close the dampers 97 in the exhaust duct 64 through the medium of the damper motor 96. The closing of these dampers 97 chokes off the quantity of air relieved from the smokehouse and hence increases the pressure of the air within the smokehouse. Conversely, the opening of these dampers 97 permits a less restricted discharge of the air and hence decreases the pressure of the air within the smokehouse.

The temperature maintained within the smokehouse is regulated through a suitable adjustment provided in the double pen recording regulator 72. When the temperature within the smokehose drops below this setting, the dry bulb thermostat 76 in one of the return air ducts 66 actuates the double pen recording regulator 72 to adjust the pressure in its outlet line 81 to open the diaphragm valve 82 and admit an increased amount of steam to the heating coil 53, this increased temperature of the heating coil restoring the temperature of the air within the smokehouse to the setting of the double pen recording regulator. Conversely, a rise in temperature in the smokehouse above the setting of the double pen recording regulator effects a shutting off of the diaphragm valve 82 and hence a decrease in the amount of steam admitted to the heating coil 53.

The humidity, preferably the absolute humidity, maintained within the smokehouse is regulated through a suitable adjustment provided in the double pen recording regulator 72. When the humidity in the smokehouse rises above the setting of the double pen recording regulator 72, the wet bulb thermostat 74 in one of the outlet ducts 66 actuates the double pen recording regulator 72 to adjust the air pressure in its outlet line 86 to open the dampers 91 in the outside air duct 59, through the medium of the damper motor 90, and at the same time to close the dampers 89 in the return air duct or ducts 66 through the medium of the damper motor 88. This proportionate opening of the outside air dampers and closing of the return air dampers serves to admit a greater proportion of outside air and since the humidity of the outside air is always lower than the humidity maintained within the smokehouse, this opening of the outside dampers and closing of the return air dampers serves to lower the humidity of the air within the smokehouse. Conversely, when the humidity in the smokehouse drops slightly below the setting of the double pen recording regulator 72, the wet bulb thermostat 74 actuates the double pen recording regulator 72 to open the outside air dampers 91 and close the return air dampers 89. Thus, the proportion of humid return air in the mixture delivered to the smokehouse is increased and hence the low humidity therein restored to the setting of the double pen recording regulator 72.

If the humidity in the smokehouse drops below the capacity of the outside and return air dampers 91 and 89 to control, the wet bulb thermostat 74 actuates the double pen recording regulator 72 to adjust the air pressure in its outlet line 86 to open the diaphragm valve 99 and admit steam to the pipe 98 discharging into the upper part of the casing 40 adjacent the supply fan 42, this steam thereby humidifying the mixed air drawn into this supply fan. This steam pipe 98, as previously discussed, can also be used to extinguish fires in the unit or in the ductwork in the smokehouse.

The present invention is primarily concerned with the uniform circulation of the smoke laden air through the products on the trucks 17 in the smokehouse. To this end, in the form of the invention shown in Figs. 1–4, the row of nozzles 30 of the supply duct 26 extend from the floor the full height of the trucks 17 and discharge horizontally forward into the center of the side aisle or space 18. The smoke laden air so discharged by these nozzles 30 is therefore confined between the side wall 10 of the smokehouse and the row 15 of trucks so as to travel the full length of the aisle or space 18 and strike the front wall or door 14 of the smokehouse. Since the adjacent return air duct 35 is located at the center of the row of trucks 17, the preponderance of the smoke laden air, after striking the front wall 14, is deflected toward the center of the smokehouse and enters the front end of the row 15 of the trucks and travels the full length of this row of trucks back to the return air duct 35. A certain amount of the smoke laden air discharged from the nozzles 30 will, of course, bypass or short circuit through the side of the row 15 of trucks which forms the aisle 18, such short circuiting serving to further increase the uniformity of distribution of the conditioned air to the food products hung on the trucks of the row 15. Thus, if all of the conditioned air followed the path indicated by the arrows in Fig. 3, the products hung upon the front truck 17 of the row 15 would have the most favored treatment since this truck would first be supplied with the conditioned air, the last truck receiving only air after its driving properties and smoke content had been partly spent. This condition is avoided by the short circuiting of a part of the supplied air which occurs through the outer side of the row 15 of trucks and which insures a uniform supply of freshly conditioned air to all of the trucks of this row. It will be understood that a balanced uniformity is achieved by adjusting the size of the nozzles 30 and the pressure of the air supplied.

The nozzles 31 of the opposite side supply duct 27 operate, with reference to the side space or aisle 19 and the row 16 of trucks, in the same manner as the nozzles 30, as above described, with reference to the side space or aisle 18 and row 15 of trucks and hence this description is not repeated.

The central supply duct 25 is provided with two vertical rows 28 and 29 of nozzles which extend from the floor the full height of the trucks 17 and are forwardly directed so that these nozzles produce two forwardly moving vertical streams or sheets of air which flow side by side until reaching the front wall or door 14 of the smokehouse. Upon reaching this front wall, the stream of air from the nozzles 28 is deflected toward the side wall 10 of the smokehouse and so as to enter the end of the row 15 of trucks to flow backwardly therethrough to the return duct 35 in the same manner as with the stream of air provided by the nozzles 30. Also, as with the stream of air provided by the nozzles 30, a part of the stream of air from the nozzles 28 short circuits or by-passes through the adjacent side of the row 15 of trucks so as to provide uniform distribution of the air supplied to all the products on the row 15 of trucks. In the same manner, the stream of air from the nozzles 29, upon reaching the front wall 14 of the smokehouse, is deflected toward the side wall 11 of the smokehouse so as to enter the end of the row 16 of trucks to flow backwardly therethrough to the return duct 36 in the same manner as with the stream of air provided by the nozzles 31. Also, as with the stream of air provided by the nozzles 31, a part of the stream of air from the nozzles 29 short circuits through the adjacent side of the row 16 of trucks so as to provide uniform distribution of the air supplied to all the products on the row 16 of trucks.

In installing the system forming the subject of the present invention in smokehouses, it frequently occurs that the smokehouse structure itself is in existence and it is necessary to adapt the ductwork and the unit to the existing smokehouse structure. In so adapting the invention to smokehouses already in existence, it may be impossible to arrange the ductwork in the manner shown in Figs. 1–4 and to meet such conditions the modified arrangements of the ductwork shown in Figs. 5–8 can be employed.

In Figs. 5 and 6 is shown an arrangement in which the structure of the smokehouse is the same as that shown in Figs. 1–4 and accordingly the same reference numerals have been employed. However, the smokehouse is shown as being narrower and longer than the smokehouse shown in Figs. 1–4 so that it is impossible to arrange the ductwork at the rear end wall of the smokehouse to discharge down side and center aisles. With the smokehouse as shown in Figs. 5–6 the trucks 17 are shown as arranged in three transverse rows 100, 101 and 102 of two trucks each, these trucks being arranged so as to leave a comparatively narrow aisle 103 between the row 100 and the front wall or door 14 of the smokehouse; a comparatively narrow aisle 104 between the rear wall 13 of the smokehouse and the row 102 of trucks; and comparatively wide aisles 105 and 106 between the center row 101 of trucks and the two rows 100 and 102. The smoke laden air is shown as supplied from a ceiling duct 110 arranged at the corner between the roof 12 of the smokehouse and either side wall 10 or 11 thereof, this duct being shown as extending the full length of the smokehouse. This duct is supplied with smoke laden air from a unit as shown in Figs. 1-4 and supplies this smoke laden air to vertical branch ducts 111, 112, 113 and 114 each of which extends downwardly to a point close to the floor of the smokehouse. Each of these vertical branch ducts is shown as provided with a vertical series of nozzles 115, each of these series of nozzles 115 extending substantially the full height of the trucks 17. The nozzles from the branch duct 111 discharge into the corresponding end of the aisle 103 between the row 100 of trucks and the front wall or door of the smokehouse. The nozzles of the branch duct 112 discharge into the corresponding end of the aisle 105 between the rows 100 and 101 of trucks. The nozzles of the branch duct 113 discharge into the corresponding end of the aisle 106 between the rows 101 and 102 of the trucks and the nozzles of the branch duct 114 discharge into the corresponding end of the aisle 104 between the rear wall 13 of the smokehouse and the row 102 of trucks therein.

The return air duct 120 is shown as arranged along the floor of the smokehouse and as arranged directly under and parallel with the supply duct 110. This return air duct leads to the air conditioning unit in the same manner as the return air ducts 66 in the form of the invention shown in Figs. 1-4. This return air duct is shown as having three vertical branches 121, 122 and 123, each of which extends the full height of the trucks 17 and is provided with a vertical series of openings 124. The branch duct 121 is arranged in line with the row 100 of trucks. The branch duct 122 is arranged in line with the row 101 of trucks and the branch duct 123 is shown as arranged in line with the row 102 of trucks.

It will be seen that the uniform distribution of the smoke laden air to the products carried by the trucks 17 is accomplished in the form of the invention shown in Figs. 5 and 6 in the same manner as is shown in Figs. 1-4. Thus, the smoke laden air discharged by the nozzles 115 is confined by the corresponding aisle so as to travel the full length of the aisle and strike the opposite side wall of the smokehouse. Since the branches of the return air duct 120 are located at the centers of the rows of trucks 17, the preponderance of the smoke laden air after striking this opposite side wall of the smokehouse is deflected laterally and travels the full length of the corresponding row of trucks back to the corresponding branch of the return air duct 120. A certain amount of the smoke laden air discharged from the nozzles 115 will, of course, bypass or short circuit through the sides of the rows of trucks, such short circuiting serving to further increase the uniformity of distribution of the conditioned air to the food products hung on the trucks 17.

In Figs. 7 and 8 is shown another arrangement of the duct-work which can be employed in carrying out the present invention. In this form of the invention the smokehouse is of the same construction as that illustrated in Figs. 1-6, with the exception that two doors 14 are provided in the front wall of the smokehouse. The trucks 17 are shown as arranged individually within the smokehouse, three trucks being shown as arranged at each side of the smokehouse with a space or aisle 130 between the rear wall 13 of the smokehouse and the rear truck 17; spaces or aisles 131 and 132 between the center truck 17 and the rear and front trucks, respectively; and a space or aisle 133 between each front door 14 and the corresponding front truck 117. Each of the trucks 17 is also spaced from the corresponding side wall of the smokehouse so as to leave an aisle or space 134.

The smoke laden air is introduced through a ceiling duct 135 which extends centrally of the smokehouse the full length thereof. The supply duct is provided with vertical branch ducts 136, 137, 138 and 139, each of which extends downwardly from the horizontal supply duct 135 in line with the corresponding aisle 130, 131, 132 and 133. Each of these branch ducts is provided on its opposite sides with a row of horizontal nozzles 140 which discharge the smoke laden air horizontally into the corresponding aisle and against the corresponding side wall 10 or 11 of the smokehouse.

The return air duct 145 is shown as arranged on the floor of the smokehouse directly under the supply duct 135 and extending substantially the full length of the smokehouse. This return air duct is shown as provided with three vertical branches 146, 147 and 148 which extend upwardly intermediate the branches of the supply duct 135. On its opposite sides each of the branches of the return air duct 145 is provided with an opening 150, these openings being arranged in a vertical series in each branch and extending substantially the full height of the branch. Each of the branches of the return air duct 145 is in line with a corresponding truck 17 and it will therefore be seen that the smoke laden air discharged by each of the nozzles 140 into the center of the corresponding aisle is deflected by the corresponding side wall of the smokehouse so as to return through the corresponding truck 17 to the outlet openings 150 of the branches of the return air duct 145.

From the foregoing it will be seen that the present invention provides a method and apparatus for uniformly distributing conditioned and smoke laden air to all of the food products contained within a smokehouse, thereby to improve the uniformity and quality of the product and to permit of more exact control of the processing. It will further be seen that all overhead ductwork can be avoided, thereby to permit of reducing the height of the smokehouse and that a relatively small amount of ductwork can be provided along the rear wall of the smokehouse where it provides the least interference to loading, unloading and inspecting the products in the smokehouse.

I claim as my invention:

1. In a combination of apparatus for smoking food products, means forming a smokehouse enclosure having side walls defining an area of substantial horizontal extent and having a low ceiling providing low head room in the enclosure, holders supporting the food products in said enclosure and arranged in at least one row to provide aisles along the opposite sides of said food products, air propelling means for delivering a stream of air to said enclosure, a heating element in said stream of air delivered to said enclosure by said air propelling means to heat said stream of air to a desired temperature, means for adding smoke to said stream of air prior to its delivery to said enclosure, means at the corresponding ends of said aisles for discharging said stream of smoke laden, heated air in a plurality of superposed streams directed horizontally into and lengthwise of each of said aisles, an outlet duct communicating with said enclosure and arranged between said aisles at the end of said row adjacent said corresponding ends of said aisles for withdrawing said smoke laden air from said enclosure, and means for adjusting the effective temperature of said heating element to adjust the temperature of the stream of air so delivered to said enclosure.

2. In a combination of apparatus for smoking food products, means forming a smokehouse enclosure having side walls defining an area of substantial extent and having a low ceiling providing low head room in the enclosure, holders supporting a quantity of the food products and arranged in rows of substantial length, height and breadth in said enclosure with aisles arranged along the opposite longitudinal sides thereof, air propelling means delivering a stream of air to said enclosure, a heating element in said stream of air delivered to said enclosure to heat said stream of air to a desired temperature, means for adding smoke to said stream of air prior to its delivery to said enclosure, a vertical supply duct arranged adjacent one wall of said enclosure in the same end of each of said aisles and receiving said smoke laden, heated stream of air, a vertical row of horizontal nozzles mounted on each of said supply ducts and discharging the stream of smoke laden air in the same direction in a plurality of streams directed lengthwise into said aisles and alongside said row of food products, a vertical return air duct arranged between said supply ducts adjacent said one wall of said enclosure and in line with the row of food products, a vertical row of openings in said return air duct, means for discharging the smoke laden air received by said return duct from said enclosure and means for adjusting the effective temperature of said heating element to adjust the temperature of the air delivered to said enclosure.

3. In a combination of apparatus for smoking food products, means forming a smoke house enclosure of substantial horizontal area, holders supporting a quantity of the food products and arranged in at least one row of substantial length, height and breadth in said enclosure with aisles arranged along the opposite longitudinal sides thereof, air propelling means delivering air to said enclosure, a heating element in the stream of air delivered to said enclosure by said air propelling means to heat said stream of air to a desired temperature, means for adding smoke to said stream of air prior to its delivery to said enclosure, means at the same end of each of said aisles for discharging said stream of smoke laden, heated air in the same direction in a plurality of superposed streams directed horizontally into and lengthwise of said aisles and toward the opposite end wall of said enclosure, said streams of smoke laden air impinging against said opposite end wall of said enclosure and said opposite end wall of said enclosure being arranged adjacent the corresponding end of said row whereby the smoke laden air is caused to enter said row of food products from the sides thereof along the full length of said aisle and also from the end thereof adjacent said opposite end wall, an outlet communicating with said enclosure and arranged between said aisles and in line with said row of products and adjacent said smoke laden air discharging means whereby the smoke laden air so drawn into the food products from the sides and opposite end of said row are withdrawn from said enclosure, and means for adjusting the effective temperature of said heating element to adjust the temperature of the air delivered to said enclosure.

4. In a combination of apparatus for smoking food products, means forming a smokehouse enclosure of substantial horizontal area, holders supporting a quantity of the food products and arranged in at least one row of substantial length, height and breadth in said enclosure with aisles arranged along the opposite longitudinal sides thereof, air propelling means delivering air to said enclosure, a heating element in the stream of air delivered to said enclosure by said air propelling means to heat said stream of air to a desired temperature, means for adding smoke to said stream of air prior to its delivery to said enclosure, a vertical supply duct arranged adjacent one wall of said enclosure and at the same end of each of said aisles and receiving said smoke laden, heated stream of air, a vertical row of horizontal nozzles mounted on each of said supply ducts and discharging the stream of smoke laden air in the same direction in a plurality of superposed streams directed horizontally into and lengthwise of said aisles and toward the opposite wall of said enclosure, said streams of smoke laden air impinging against said opposite wall of said enclosure and said opposite wall of said enclosure being arranged adjacent the corresponding end of said row whereby the smoke laden air is caused to enter said row of food products from the sides thereof along the full length of said aisle and also from the end thereof adjacent said opposite wall, a vertical return duct arranged between said supply ducts adjacent said one wall of said enclosure and in line with the row of products, a vertical row of openings in said return duct whereby the smoke laden air so drawn into the food products from the sides and opposite end of said row are withdrawn from said enclosure, means for discharging the smoke laden air received by said return air duct from said enclosure, and means for adjusting the effective temperature of said heating element to adjust the temperature of the air delivered to said enclosure.

OLIVER F. GILLIAM.